United States Patent

[11] 3,623,705

| [72] | Inventors | James Arthur Townsley;<br>Roy Trunley, both of Ilford, England |
|---|---|---|
| [21] | Appl. No. | 774,448 |
| [22] | Filed | Nov. 8, 1968 |
| [45] | Patented | Nov. 30, 1971 |
| [73] | Assignee | Ilford Limited<br>Ilford, England |
| [32] | Priority | Nov. 9, 1967 |
| [33] | | Great Britain |
| [31] | | 51121/67 |

[54] SOLUTION MIXING APPARATUS
1 Claim, 2 Drawing Figs.

[52] U.S. Cl. .................................................. 259/8,
239/400
[51] Int. Cl. .................................................. B01f 7/20
[50] Field of Search ............................................ 259/2, 4, 5,
6, 7, 8, 9, 10, 18, 19, 21, 22, 23, 24, 25, 26, 28, 36,
37, 40, 41, 42, 43, 44, 45, 46, 66, 67, 95, DIG. 30,
102, 103, 106, 107, 108; 107/30, 38, 40, 36;
222/136, 226; 137/111; 239/310, 317, 381, 383,
389, 398, 399, 400

[56] References Cited
UNITED STATES PATENTS

| 1,683,500 | 9/1928 | Thordarson .................. | 259/DIG. 30 |
| 1,842,877 | 1/1932 | Muller et al. .................. | 259/DIG. 30 |
| 944,679 | 12/1909 | Lawler .......................... | 15/29 |
| 2,857,144 | 10/1958 | Gurley, Jr. et al. ............ | 259/7 |

Primary Examiner—Leon G. Machlin
Attorney—Cushman, Darby & Cushman

ABSTRACT: This application describes an apparatus for the continuous mixing of liquids which comprises a cylindrical mixing chamber which contains axially supported at both ends thereof a free running paddle which has a plurality of blades the length of which is substantially the length of the mixing chamber, two or more liquid inlet jets equidistantly spaced around the circumference of the mixing chamber at the same level, each jet being arranged to discharge liquid tangentically into the mixing chamber in the same rotational direction and there being a restriction-free exit aperture from the mixing chamber positioned axially at one end of the mixing chamber, the other end being closed.

PATENTED NOV30 1971 3,623,705

Inventors
James Arthur Townsley
Roy Trunley
By Cushman, Darby & Cushman
Attorneys

SOLUTION MIXING APPARATUS

This invention relates to an apparatus for homogeneously mixing liquids.

According to the present invention there is provided an apparatus for the continuous mixing of liquids which comprises a cylindrical mixing chamber which contains axially supported at both ends thereof a free running paddle which has a plurality of blades the length of which is substantially the length of the mixing chamber, two or more liquid inlet jets equidistantly spaced around the circumference of the mixing chamber at the same level, each jet being arranged to discharge liquid tangentically into the mixing chamber in the same rotational direction and there being a restriction-free exit aperture from the mixing chamber positioned axially at one end of the mixing chamber, the other end being closed.

"In the same rotational direction" means that the liquid inlet jets are so arranged that when the streams of liquid therefrom are discharged into the mixing chamber each contributes to the effect of the liquid swirling around the mixing chamber in one direction.

It is preferred that in use the apparatus is held with its axis vertical and with the exit aperture at the bottom of the vertical mixing chamber.

It is preferred that the size of the mixing chamber is comparatively large in relation to the size of the inlet jets and that all the inlet jets are of the same size. Also it is preferred that the inlet velocity of the liquid from all the jets is above 4 meters/second. The average dwell time of the liquid in the mixing chamber is preferably not more than 1 second.

In use the free running paddle rotates solely due to the impact of the liquid expelled from the tangentically arranged inlet jets.

The following drawings will serve to illustrate one embodiment of the apparatus.

Figure 1:
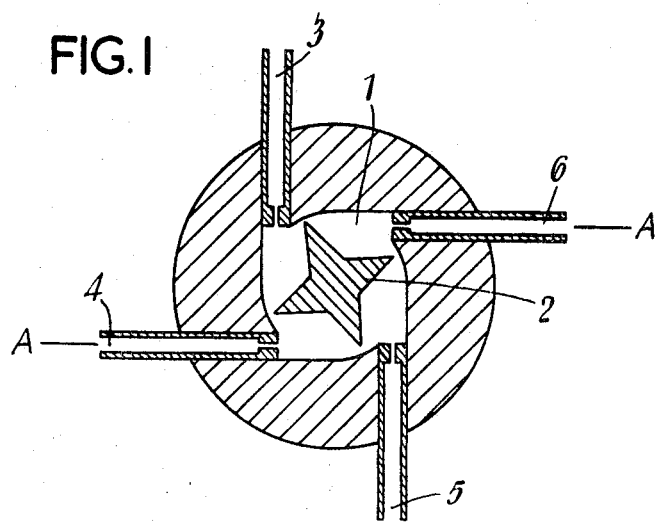
FIG. 1 is a cross-sectional plan view of the apparatus at the level of the solution inlet jets.

In FIG. 1 a cylindrical mixing chamber 1 has positioned axially therein a paddle 2 and equidistantly spaced around the chamber are four solution inlet jets 3–6.

Figure 2:
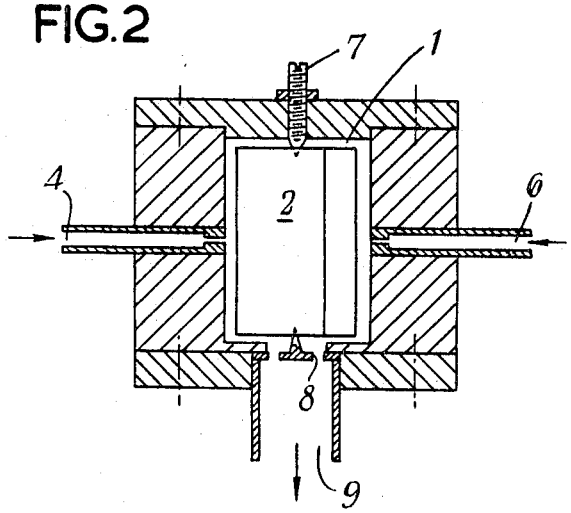
FIG. 2 is a cross-sectional side elevation through the axis of the mixing chamber taken along a line A—A of FIG. 1.

In FIG. 2 in the cylindrical mixing chamber 1 the blades of the paddle 2 are shown as being almost the same height as the mixing chamber 2. The position of the jets 4 and 6 is shown. The paddle 2 runs on a top bearing pin 7 and is supported on a bottom bearing pin 8. Below the bearing pin 8 is the unrestricted exit aperture 9.

The apparatus of the present invention is of particular use in condensation methods of controlled precipitation. In such methods the substance to be dispersed is dissolved in a liquid medium, this solution is rapidly mixed with a liquid in which it is highly insoluble, preferably in the presence of a protective colloid.

A particular example of a condensation method of controlled precipitation is described in British Pat. application No. 49,263/67.

In this application a photographic color coupler which is water insoluble but aqueous-alkali soluble is dissolved in a mixture of a water-miscible organic solvent and aqueous alkali. When this solution is mixed with acidified gelatin solution a fine dispersion of the color coupler in the gelatin solution is obtained.

However when the two solutions are mixed using the apparatus of the present invention the fine dispersion of color coupler is improved since the size of the coupler particles is considerably more uniform.

In order to mix these solutions in the correct proportions acidified gelatin solution is injected into the apparatus through three of the inlet jets and the organic solvent/aqueous alkali solution of color coupler is injected through the fourth solution inlet jet. If a solution inlet velocity of 8 meters/second is used for the solutions being injected through all the jets then using a mixing chamber having a volume of 1.4 cc. the average dwell time of the solutions in the chamber is one-tenth of a second and the throughput of the apparatus is 10 gals./hour. When the paddle was removed from the apparatus the color coupler was not as finely dispersed throughout the gelatin solution as when it was present.

We claim as our invention:

1. An apparatus for the continuous mixing of liquids which comprises a vertical cylindrical mixing chamber having top and bottom ends and which contains axially supported at both ends thereof a free running paddle which has a plurality of blades the length of which is substantially the length of the mixing chamber, two or more liquid inlet jets equidistantly spaced around the circumference of the mixing chamber at the same level, each met being arranged to discharge liquid tangentially into the mixing chamber in the same rotational direction, means for supplying at least two different liquids to at least two of the liquid inlet jets and there being an exit aperture from the mixing chamber positioned axially in the bottom end of the mixing chamber, the top end being closed.

* * * * *